(12) United States Patent
Chiou et al.

(10) Patent No.: US 9,229,090 B2
(45) Date of Patent: Jan. 5, 2016

(54) METHOD FOR INDOOR/OUTDOOR CALL JUDGMENT

(71) Applicants: Ta-Gang Chiou, Taipei (TW); Shu-Yuan Lin, Taipei (TW)

(72) Inventors: Ta-Gang Chiou, Taipei (TW); Shu-Yuan Lin, Taipei (TW)

( * ) Notice: Subject to any disclaimer, the term of this patent is extended or adjusted under 35 U.S.C. 154(b) by 143 days.

(21) Appl. No.: 13/748,825

(22) Filed: Jan. 24, 2013

(65) Prior Publication Data

US 2013/0190010 A1    Jul. 25, 2013

Related U.S. Application Data

(60) Provisional application No. 61/632,384, filed on Jan. 24, 2012.

(51) Int. Cl.
 *H04W 24/00* (2009.01)
 *G01S 5/02* (2010.01)
 *H04W 24/10* (2009.01)
 *H04W 24/08* (2009.01)

(52) U.S. Cl.
 CPC ............. *G01S 5/0252* (2013.01); *H04W 24/10* (2013.01); *H04W 24/08* (2013.01)

(58) Field of Classification Search
 CPC ....... G08G 1/0104; H04W 8/04; H04W 8/06; H04W 8/12; H04W 88/02; H04W 64/00
 USPC .......... 455/404.2, 456.1, 456.2, 456.3, 456.4, 455/456.5, 456.6, 432.1, 432.2, 432.3, 455/435.1, 436–444
 See application file for complete search history.

(56) References Cited

U.S. PATENT DOCUMENTS

| 5,937,354 | A  | * | 8/1999  | Bala et al. ..................... 455/459 |
| 5,943,621 | A  | * | 8/1999  | Ho et al. ..................... 455/456.3 |
| 8,583,108 | B2 | * | 11/2013 | Chang et al. ............... 455/432.1 |
| 8,644,818 | B1 | * | 2/2014  | Okmyanskiy et al. ..... 455/432.1 |
| 2007/0232321 | A1 | * | 10/2007 | Casati et al. ............... 455/456.1 |

\* cited by examiner

*Primary Examiner* — Olumide T Ajibade Akonai

(57) ABSTRACT

The indoor/outdoor call judgment method comprises the following steps. Firstly, to build an algorithm and indicator function for determining indoor/outdoor call by analyzing drive test data. Secondly, to retrieve the event log data to be judged by the method, and find the position of the retrieved event log data by means of geo-location tools. Thirdly, to determine whether the retrieved event log data are referring to a moving call, if "YES", then the event log is determined to be referring to an outdoor call. Fourthly, to determine whether or not the event log data are referring to an Indoor call by using the pre-built algorithm and the indicator function. Users' behavior, Cell antenna module and signal strength difference are considered when building the algorithm and indicator function so as to increase the accuracy of the indoor/outdoor call judgment method.

19 Claims, 18 Drawing Sheets

| DATE_TIME | MEASURED_CELL_ID | MEASURED_RSCP | MEASURED_ECNO | MEASURED_TM | MEASURED_OFFSET |
|---|---|---|---|---|---|
| 2011/4/27 14:05 | 527,695,276,716,008 | 45,42,40 | 27,21,18 | 209,922,150,428,122 | 2,2,99 |
| 2011/4/27 14:05 | 527,695,276,716,008 | 45,42,40 | 27,21,17 | 209,922,150,428,122 | 2,2,99 |
| 2011/4/27 14:05 | 5,276,952,767 | 45,42 | 27,22 | N,N | N,N |
| 2011/4/27 14:05 | 527,675,276,916,008 | 40,39,38 | 28,25,25 | 215,042,099,228,122 | 2,2,99 |
| 2011/4/27 14:05 | 527,675,276,916,008 | 42,39,31 | 31,25,11 | 215,042,099,228,122 | 2,2,99 |
| 2011/4/27 14:05 | 527,675,276,916,008 | 41,42,34 | 28,26,14 | 215,042,099,228,122 | 2,2,99 |
| 2011/4/27 14:05 | 5,276,752,769 | 45,38 | 37,23 | 2,150,420,992 | 2,2 |
| 2011/4/27 14:05 | 5,276,752,769 | 46,38 | 37,22 | N,N | N,N |
| 2011/4/27 14:05 | 527,675,276,916,008 | 45,42,32 | 31,26,6 | 215,042,099,228,122 | 2,2,99 |
| 2011/4/27 14:05 | 5,276,952,767 | 45,37 | 28,12 | 2,099,221,504 | 2,2 |
| 2011/4/27 14:05 | 527,695,276,716,008 | 45,37,33 | 28,11,5 | 209,922,150,428,122 | 2,2,99 |
| 2011/4/27 14:05 | 5,276,952,767 | 45,37 | 28,11 | N,N | N,N |
| 2011/4/27 14:05 | 527,695,276,716,008 | 40,40,32 | 27,26,11 | 209,922,150,428,122 | 2,2,99 |
| 2011/4/27 14:05 | 5,276,952,767 | 44,38 | 28,17 | 2,099,221,504 | 2,2 |

FIG. 7

METHOD FOR INDOOR/OUTDOOR CALL JUDGMENT

BACKGROUND OF INVENTION

1. Field of the Invention

The invention relates to a method for indoor/outdoor call judgment, and more particularly to a method which utilizes the event logs in a cellular network to determine whether the user is located in an indoor place but with outdoor serving Cell services in a cellular network.

2. Description of the Prior Art

As the cellular networks evolve, the need of high-speed data transmission in addition to the enhancement of general Internet is also exploding. Operators need to increase their emphasis on the service coverage's signal quality. Through the positioning algorithm, an operator can denote the specific user on the specific location of the Cell's coverage to troubleshoot possible call quality problems. The location place of the antenna can be divided into Indoor type or Outdoor type. The antenna pattern can be divided into Sector and Omni, depending on the characteristics of the antenna base stations. If the operator can distinguish different types of user location so that they may quickly get the solution for improving the service environment for special serving issue, such as interference or call issue like unexpected drop call. As interior architecture cannot always be provisioned by indoor antenna, service calls most still rely on the coverage of the outdoor antenna. To classify the calls made from indoor location but serviced by outdoor antenna, the identification method is proposed in the present invention. So that the operator can distinguish between likely indoor versus outdoor calls or transmissions for various purposes, such as optimizing the network, choosing proper traffic offload method, improving applications based on the subscribers' indoor versus outdoor status, etc.

Currently, there are many solutions on the positioning, such as GPS positioning, mobile positioning, event-log positioning, triangulation, time difference positioning, and etc. After the positioning, we still don't know the location is indoor or outdoor, if we don't have GPS for outdoor detection. The present invention introduces a method for determine whether the user is located in the indoor place but with outdoor serving Cell services. This subject is related to the calculation method proposed herein, which allows the computer system to utilize network-side event-log data collection to determine if a call, user, event, or device to be indoors or outdoors. The method uses those data for classifying the data set and using algorithm to distinguish the indoor calls automatically and with confidence.

SUMMARY OF THE INVENTION

Accordingly, it is the primary object of the present invention to provide an indoor/outdoor call judgment method which utilizes event logs in a cellular network to determine whether the user is located in the indoor place but with outdoor serving Cell services in a cellular network.

A preferred embodiment of an indoor/outdoor call judgment method in accordance with the present invention comprises the following steps. Firstly, to build an algorithm and indicator function for determining indoor/outdoor call by analyzing drive test data. Secondly, to retrieve the event log data to be judged by the method, and find the position of the retrieved event log data by means of geo-location tools. Thirdly, to determine whether the retrieved event log data are referring to a moving call, if "YES", then the event log is determined to be referring to an outdoor call. Fourthly, to determine whether or not the event log data are referring to an Indoor call by using the pre-built algorithm and the indicator function. Users' behavior, Cell antenna module and signal strength difference are considered when building the algorithm and indicator function so as to increase the accuracy of the indoor/outdoor call judgment method.

In a preferred embodiment, a process for analyzing a specific user's behavior in order to generate at least one user behavior parameter is further included. The event log associated with the specific user is then analyzed to see if there is any data of the event log match any said user behavior parameter so as to determine whether or not the event log is referring to said indoor call.

In a preferred embodiment, during the process of analyze the event log associated with the specific user, if the geographical position associated with the event log data is at or nearby the specific user's office or home, and the event log data contains the events of either vast data transmission or manually turn off the mobile device, then the event log is determined to be referring to the indoor call.

BRIEF DESCRIPTION OF THE DRAWINGS

The present invention will now be specified with reference to its preferred embodiment illustrated in the drawings, in which:

FIG. 7 shows an exemplary list of the call event records which contain the values of (tm, offset) in accordance with the present invention;

DESCRIPTION OF THE PREFERRED EMBODIMENT

The invention disclosed herein is directed to an indoor/outdoor call judgment method which comprises the following steps. Firstly, to build an algorithm and indicator function for determining indoor/outdoor call by analyzing drive test data. Secondly, to retrieve the event log data to be judged by the method, and find the position of the retrieved event log data by means of geo-location tools. Thirdly, to determine whether the retrieved event log data are referring to a moving call, if "YES", then the event log is determined to be referring to an outdoor call. Fourthly, to determine whether or not the event log data are referring to an Indoor call by using the pre-built algorithm and the indicator function. Users' behavior, Cell antenna module and signal strength difference are considered when building the algorithm and indicator function so as to increase the accuracy of the indoor/outdoor call judgment method.

Figure 1:
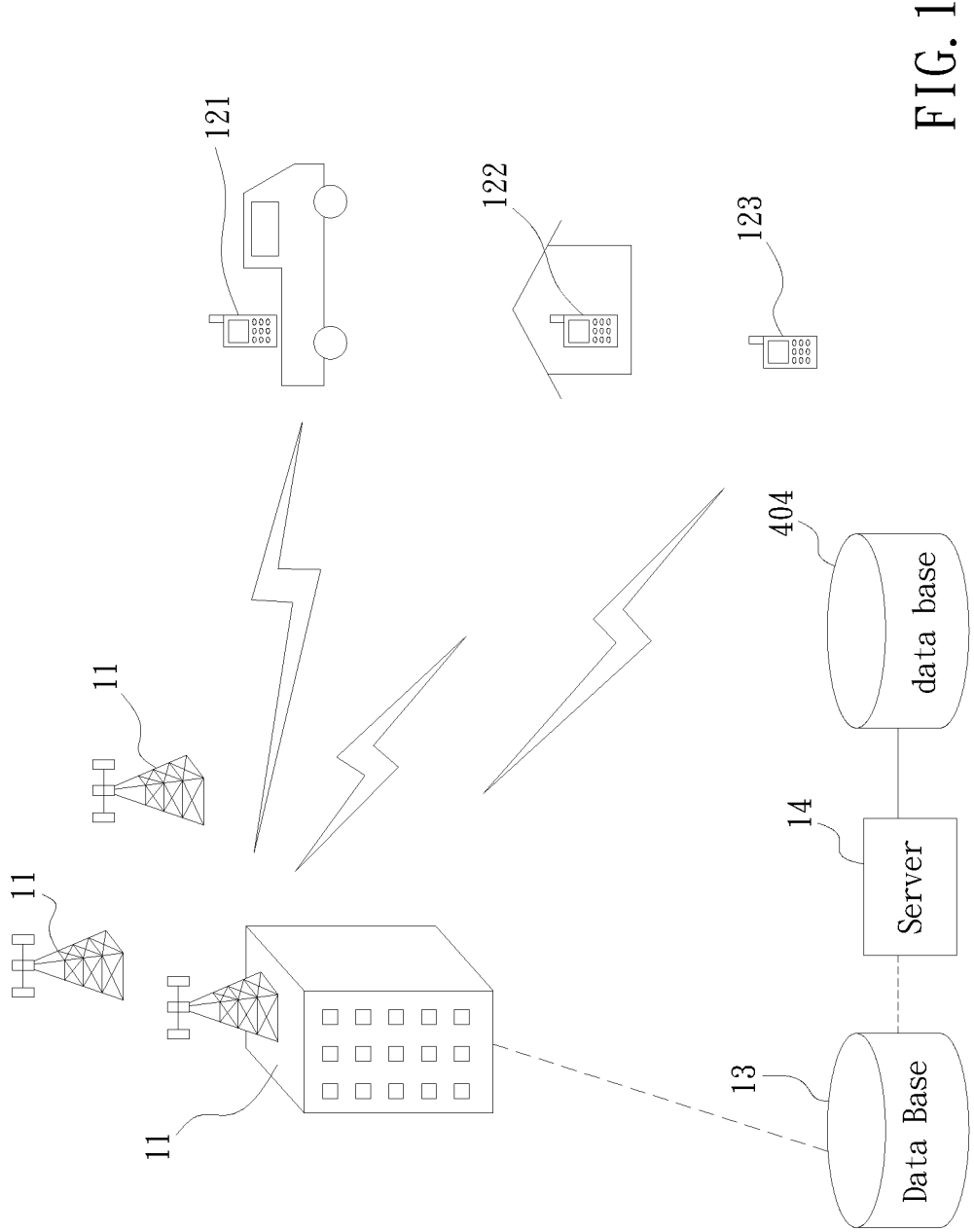
FIG. 1 is a schematic drawing of a preferred embodiment of an indoor/outdoor call judgment system in accordance with the present invention.

FIG. 1 illustrates a schematic drawing of a preferred embodiment of an indoor/outdoor call judgment system in accordance with the present invention. As shown in FIG. 1, a plurality of users may use mobile devices 121,122,123 such like mobile phones, wireless networking devices or other telecommunicating devices to connect with one of the base stations 11 (such like but not limited to: 3G, CDMA or LTE mobile stations, access points or other alike devices in a mesh or cellular network) in order to enjoy the telecommunication services provided by these base stations 11 in a mesh or cellular network. Taking mobile networking system as an example, users may make calls, browse internet, download/upload data, send SMS messages or send emails by using their mobile devices 121,122,123 such as smart phones either in an indoor location, an outdoor location, or even in a car. During the period of connection, the base station 11 which these mobile devices 121,122,123 are connecting with will acquire records of call events including some measurement reports from the mobile devices 121,122,123. These acquired call events are then stored as the event log in a database 13 controlled by the telecommunication service provider such like the RNC of the 3G system or the MME of the LTE system. The indoor/outdoor call judgment system in accordance with the present invention comprises a server 14 which is connectable with the database 13 and can retrieve the call records (e.g., event logs) from the database 13 for determining indoor/outdoor calls. It should be noted that, the term "call" in the present invention does not merely refer to "make phone call" only, this term also refers to any activity or event of the mobile device which can generate or trigger a event log, such as but not limited to: circuit-switched call, packet-switched call, signaling call, location update, data transmission, and etc. In another embodiment, the event log can also contain a session of several continuous calls.

Figure 2:
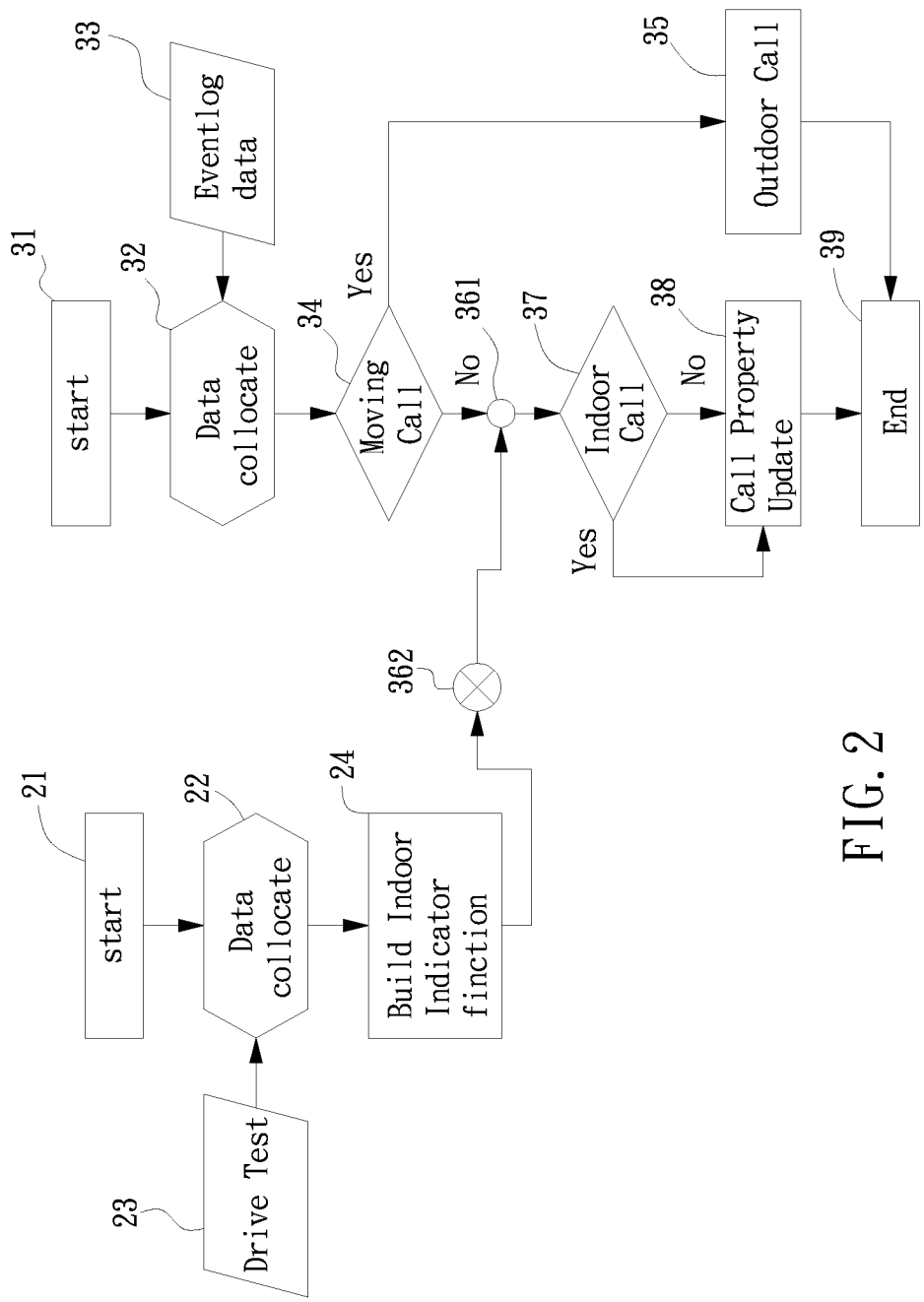
FIG. 2 is a schematic flowchart of a preferred embodiment of an indoor/outdoor call judgment method in accordance with the present invention.

FIG. 2 illustrates a schematic flowchart of a preferred embodiment of an indoor/outdoor call judgment method in accordance with the present invention. Before starting the determination of indoor/outdoor calls, it is necessary to build up the associated algorithm and indicator functions. One way to start (step 21) with it is to perform a drive test (step 23) in order to acquire a large amount of drive-testing data collocated with precise geographical location information (step 22). These collocated drive-testing data are then analyzed by using statistics to build up the algorithm and indicator functions that will be used for indoor/outdoor call judgments later (step 24). These algorithm and indicator functions are stored in another database 404 which is different from the database 13 of base stations 11 and is connected with and controlled by the server 14, as shown in FIG. 1.

When starting the indoor/outdoor call judgments process (step 31), the server retrieves event log data from the database 13 of base stations 11 (step 33), collocates these retrieved data (step 32), and associates the geographical position of the event log data by using conventional geo-location tools, such like but not limited to: GPS positioning, mobile positioning, event-log positioning, triangulation, time difference positioning, and etc. Then, a process is performed for determining whether or not the call event belongs to a moving call (step 34). If a call belongs to a moving call, then it can be determined as an outdoor call (step 35), and thus the determination is ended (step 39). If a call is not a moving call, then the data of that call will be further calculated (steps 361 and 362) by using the algorithm and indicator functions stored in the database controlled by the server in order to determine whether the call belongs to an Indoor call (step 37) or an outdoor call. After calculations, the result will be stored in the database 404 of the server 14 and also be used to update the call property (step 38).

From the discussions above, it can be understand that the processes for building up the associated algorithm and indicator functions are important, because imprecise algorithm or indicator functions will result in incorrect indoor/outdoor call judgments. Therefore, before starting the illustrations of how to build up the algorithm and indicator functions, it is necessary to probe into the possible parameters that might influence these algorithm or indicator functions.

(I) The Antenna Quality and Signal Strength Issue

The issue of Antenna quality and signal strength is relating to the quality of telecommunicating signals, which might influence the decisions of the algorithm and indicator functions. This issue further comprises the following considerations:

1) Antenna pattern: Antenna model/antenna gain/coverage; since different kind of Antenna pattern might result in different signal quality, thus it is important to know what kind of Antenna model would have what kind of antenna gain and coverage data;

1.1) Link Budget; wherein, "Link Budget (dBm)"="TX-power (dB)"–"Feeder/Cable/Combiner Loss (dB)"+"Antenna gain (dB)" Path loss (dB)", which must equal to or larger than "RX-sensitivity (dB)";

2) Indoor/outdoor difference; several issues should be considered regarding to the difference between an indoor call and an outdoor call, such as:

2.1) Building; what's the differences between an indoor call made within a large building (either furnished with or without indoor antenna) and a small building without indoor antenna?

2.2) Site density; what's the differences between a call made in a city crowed with skyscrapers and an open ground?

2.3) Interference; interference such like the user of mobile phone walk around a corner during the call;

3) Cell Serving loading issue; the call event data contained in the event log should be analyzed with the following parameters, since these parameters will also influence the decisions of the algorithm and indicator functions:

3.1) Subscriber identification number; for identifying the user/mobile device;

3.2) Service type (such as PS/CS/HSPA/R99); different service type of the cell will give different weights to the parameters;

3.3) Busy hour; calls made during busy hours might suffer from poor quality in a CDMA-based network due to interference;

3.4) Office time period; user tends to make calls more frequent or transmit vast data within his/her office during the office time;

3.5) Home time period; user tend to turn off the mobile device manually during the night when he/she is going to sleep at home; and 3.6) Urban region/rural region;

3.7) Suddenly weakened signal strength; it is more likely to happen in indoor rather than outdoor when the signal strength is suddenly weakened within a short period of time.

Figure 3:
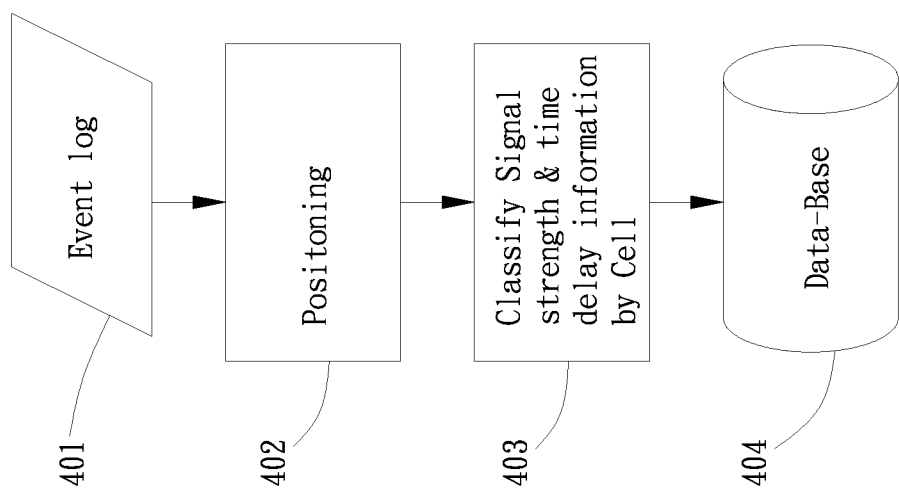
FIG. 3 is a schematic flowchart of a preferred embodiment for building the algorithms and indicator functions of the indoor/outdoor call judgment method in accordance with the present invention.

FIG. 3 illustrates a schematic flowchart of a preferred embodiment for building the algorithm and indicator functions of the indoor/outdoor call judgment method in accordance with the present invention, which comprises the following steps:

Step 401: The server retrieve the event log from the database controlled by the server for analyzing. In a preferred embodiment, this event log data are associated with the drive-testing data which is obtained by drive tests and collocated with precise geographical location information. In another embodiment, this event log data can also be obtained from telecommunication service providers. And, in yet another embodiment, this event log data can also be associated with geographical location information obtained by GPS positioning technique. Then, simulate the signal strength for each Cell and its coverage region (fragment to many grids or areas under each cell). And then, Decide the signal strength indicator for indoor and outdoor measured.

Step 402: Positioning each of the event log from the data of the network system by using geo-location tools known in the art.

Step 403: Classify Signal strength and time delay information by Cell in order to build up the algorithm and indicator functions of the indoor/outdoor call judgment method. The following issues should be considered when classifying the Signal strength and time delay information:

1) For analyzing the Specific user's behavior, try to find the period and regular call event, so as to define those event that happened in Indoor or outdoor.

2) For the threshold of signal strength indicator, we may find the pattern of signal strength of Cell & time delay or distance relation.

3) For most of the event log information record, we may find more than one measured cells' information. We may compare more than one Cell's pattern.

4) For classifying the data of the event log, also we may using antenna propagation model or antenna signal strength simulation formula like Okumura-Hata Model for propagation to find the signal strength pattern and the signal indicator for the threshold (or the difference range of indoor signal strength and outdoor signal strength).

5) With GPS or drive test information, we may use this information for refining the threshold method like threshold of signal strength for determining the indoor signal strength range.

6) If the event log correlative to the GPS/Drive Test's calls information, we may determine the call was outdoor call. Cause those events will be detected only when user located in outdoor place. Etc.

7) For the long term of the data analysis, we may build an indoor location data-base for quickly reference.

Step 404: Store the algorithm and indicator functions determined in Step 403 into the database 404 controlled by the server 14.

Figure 4:
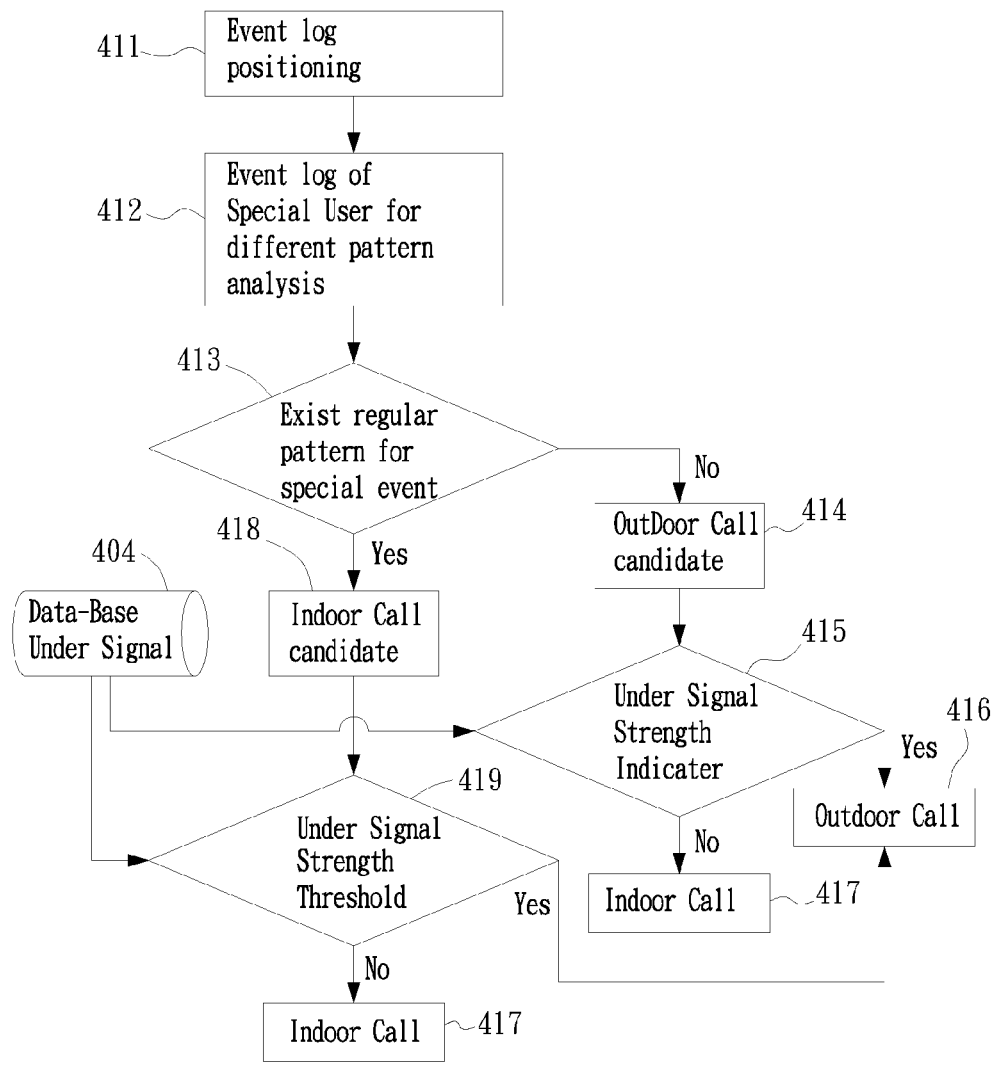
FIG. 4 is a schematic flowchart of a preferred embodiment for the method of indoor/outdoor call judgment by considering user behavior parameters in accordance with the present invention.

FIG. 4 illustrates a schematic flowchart of a preferred embodiment for the method of indoor/outdoor call judgment by considering user behavior parameters in accordance with the present invention, which comprises the following steps:

Step 411: The server retrieve the event log from the database of the base station. The records of call events contained in this event log are generated by users' call activities, rather than the drive test. Then, conventional positioning process is employed for determining the positions of where the calls of these call events are made.

Step 412: Use the event log of specific user for different pattern analysis. In this step, call event records associated with a specific user will be used for analysis by using user behavior parameters. One example of so called "specific user" is a user that we have already known or studied his/her office address, home address and/or personal habits in advance. For example, the specific user has the tendency to manually turn off his/her mobile device before getting into bed at home or attending a meeting in the office, or to download or send vast data via his/her mobile device in the office during working hours, and etc. It is understood that the data of office address, home address and/or personal habits of the specific user are pre-stored in the database controlled by the server to form the user behavior parameters for later use.

Step 413: Analyze if there exists any regular pattern for special event. In the step, the call event records associated with the specific user are analyzed to see if there is any call event matches any one of the special events (e.g., matches any one of the user behavior parameters) stated above, such that we can decide that the call events matching the special events would be indoor calls. For example, if the event log positioning shows that a call event record is generated at or nearby the specific user's office or home, and contains the events of either vast data transmission or manually turn off, then this call event record is regarding to a candidate of indoor call (Step 418). If no call event matches any one of the special events (user behavior parameters) stated above, then that call event record is regarding to a candidate of outdoor call (Step 414).

Step 415: Analyze if the signal strength of the call event of outdoor call candidate is under a signal strength indicator? If the result of analysis is "YES", then that call event record is regarding to the outdoor call (Step 416). If the result of analysis is "NO", then that call event record is regarding to the indoor call (Step 417). It is understood that the algorithm and indicator functions associated with the analysis of this step are pre-stored in the database 404 controlled by the server 14.

Step 419: Analyze if the signal strength of the call event of indoor call candidate is under a signal strength threshold? If the result of analysis is "YES", then that call event record is regarding to the outdoor call (Step 416). If the result of analysis is "NO", then that call event record is regarding to the indoor call (Step 417). It is understood that the algorithm and indicator functions associated with the analysis of this step are also pre-stored in the database controlled by the server.

By analyzing the special event of the specific user as which mentioned above in Steps 411-419, we can decide the call would be indoor call, for example, if the user power off the handset or the place in building where user enter to have meeting or theater.

Figure 5:
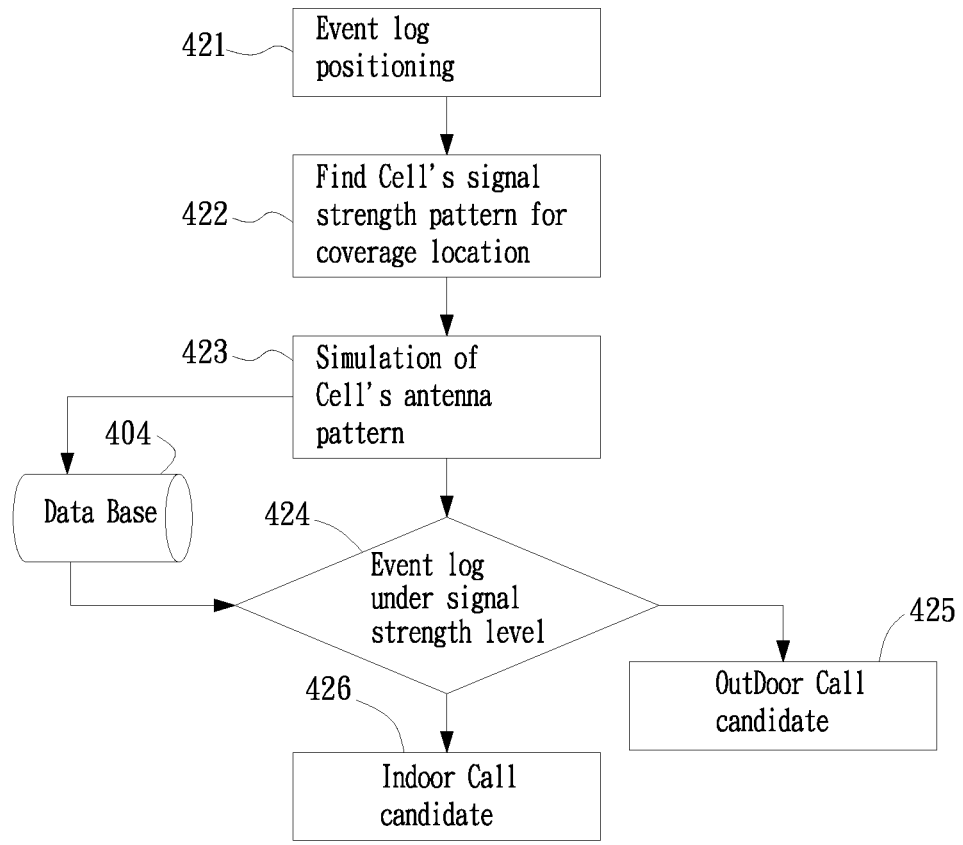
FIG. 5 is a schematic flowchart of a preferred embodiment for the method of indoor/outdoor call judgment by considering the Cell's antenna pattern in accordance with the present invention.

FIG. 5 illustrates a schematic flowchart of a preferred embodiment for the method of indoor/outdoor call judgment by considering the Cell's antenna pattern in accordance with the present invention, which comprises the following steps:

Step 421: The server retrieve the event log from the database of the base station. The records of call events contained in this event log are generated by either the users' call activities or the drive test. Then, conventional positioning process (such like GPS records or geo-location tools) is employed for determining the geographical positions of where the calls of these call events (event logs) are made.

Step 422: Build a measurement signal strength data base for the cell and its coverage by finding each Cell whose signal strength pattern can cover the geographical position of the event log. The data built in this step are stored in the database controlled by the server.

Step 423: Perform simulation of each Cell's antenna pattern, and use statistic method for finding the Cell's pattern for each grid region, and find pattern of signal strength and time delay for each Cell's coverage. Then, determine the indoor/outdoor signal strength indicator for each special grid region by using the results of the simulation mentioned in this step. The indoor/outdoor signal strength indicators for each special grid area determined in this step are stored in the database 404 controlled by the server 14.

Step 424: Position the new enter event log which is retrieved from the database of the base station, and compare the call event of the new enter event log with the signal strength indicators stored in the database to see whether the signal strength data contained in the call event are under a signal strength level according to the signal strength indicators or not, so as to decide the event log is an indoor call candidate (Step 426) or outdoor call candidate (Step 425).

Figure 6:
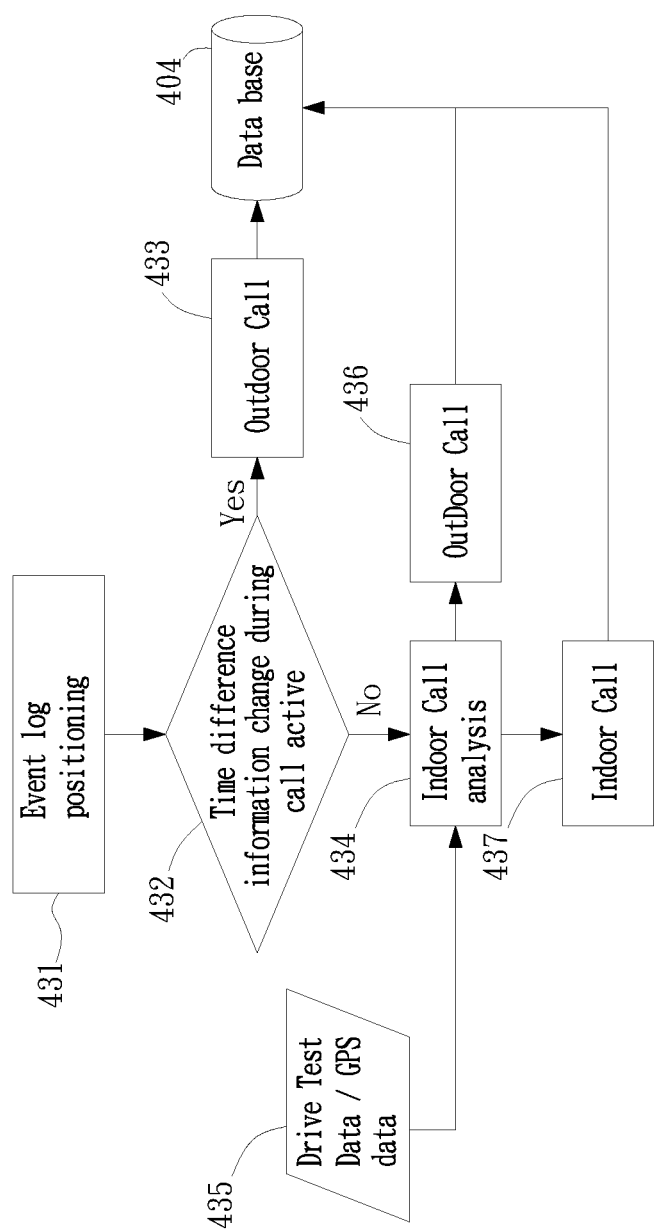
FIG. 6 is a schematic flowchart of a preferred embodiment for the method of indoor/outdoor call judgment by considering the time difference information change during call activity in accordance with the present invention.

FIG. 6 illustrates a schematic flowchart of a preferred embodiment for the method of indoor/outdoor call judgment by considering the time difference information change during call activity in accordance with the present invention, which comprises the following steps:

Step 431: The server retrieves the event log from the database of the base station. The records of call events contained in this event log are generated by the users' call activities rather than the drive test. Then, conventional positioning process (e.g., geo-location tool) is employed for determining the geographic positions of where the calls of these call events are made.

Step 432: Analyze whether the time difference information changes during the call activity or not. If the result of analyze is "YES", which means the call event is referring to a moving call, then the event log is determined to be outdoor call (Step 433), and then the result of this analysis is stored in the database 404 controlled by the server 14 for updating or fine tuning the algorithm and indicator functions. If the result of analyze is "NO", which means the call event is referring to a static call, then Step 434 is proceeded for further indoor call analysis. Of course, the determining logic of this Step 432 is based on a condition that, the user (mobile device) is served by an outdoor antenna base station but not an indoor antenna. It can be easily understood that, if the mobile device camps on an indoor antenna base station, then the mobile device is directly determined as the indoor call candidate without the need to perform the moving call determination, even that mobile device was moving (for example, making calls in a subway).

An alternative step can also be performed in this Step 432 for indoor call analysis. Since it is more likely to happen in indoor rather than outdoor that the signal strength is suddenly weakened within a short period of time, thereby, we can analyze the data of event log to see whether the values of signal strength are suddenly weakened within a short period of time or not? If "YES", then this event log can be referred to a candidate of indoor call. Moreover, if such event happens, we can use the signal strength value before suddenly weakened to be the index/indicator value for outdoor RSCP "$RSCP_{outdoor}$", and use the signal strength value after suddenly weakened to be the index/indicator value for indoor RSCP "$RSCP_{indoor}$"/and use the difference value between the $RSCP_{outdoor}$ and $RSCP_{indoor}$ to be the delta δ, which will be discussed later.

Step 434: Perform indoor call analysis. If the analyze performed in Step 432 shows that the call event of the event log is referring to a static call, then the indoor call analysis is further performed by using the processes and flow charts illustrated previously in either FIG. 4 or FIG. 5 or both, in order to determine whether or not this static call is an indoor call (Step 437) or an outdoor call (Step 436). It is an addition for this step to use the GPS data or Drive Test data (Step 435) to refine the signal strength indicators, algorithm, and/or indicator functions of the indoor/outdoor call judgment method in accordance with the present invention. For example, if a previously known event log has already been determined as an outdoor call by means of GPS data or Drive Test data (ps. GPS signal and Drive Test data only available for outdoor event logs), then the geographical position and signal strength data will be stored in the database 404, wherein the signal strength value of this previously known event log is set to be a signal strength indicator named "$RSCP_{index}$". Later, when performing the indoor call analysis mentioned in this Step 434 for other new event log, if we find that the signal strength of this new event log is equal to or higher than the $RSCP_{index}$, then it can be determined as the outdoor call, without the need to perform further calculations.

Section (A): Moving Call and Non-Moving Call Identity:

This section (A) is going to discuss the method and process to determine moving call and Non-moving call, which can be employed in the Step 432 of FIG. 6 and the Step 34 of FIG. 2. According to the event log information, if the event log contains measurement report more than two records, we may have solution to define the Moving call and Non-moving call. For each measurement record, if it contains time difference data (tm, offset).

For each one unit tm, about equal to 78.125 meter, therefore, if user and base station do not change their positions and states in a short time, then the values of (tm, offset) will not have large changes. We use more than two measurement records and the report time and the report information to distinguish that a call is a moving call or not. Please see FIG. 7 shows an exemplary list of the call event records which contain the values of (tm, offset).

Consider one cell phone and one base station, the (tm, offset) denotes the distance from cell phone to the base station. In above case shown in FIG. 7, it can be seen that during the time period from 2011-4-27 14:05:31 to 2011-4-27 14:05:39, the values of both the "MEASURED_TM" and "MEASURED_OFFSET" of the same "MEASURED_CELL_ID" number "52769" stay at the same values "20992" and "2". Therefore, we know the cell-phone may move on an equal distance curve from the base-distance or non-moving. And if we have the measurement with more than two cells' measurement reports that contains (tm, offset), then we would use mathematics tools/method to calculate the cross point of the curve. Thus, we may distinguish the user was made a non-moving (static) call if the cross point did not have big change during the time period of call event. Some of other issues will make the status change, but most of the data.

For the measurement report in the event log during a call, for each measurement of Time $T_1$, it will report the measured cell X, Y and Z, measured signal strength and quality, (RSCP, EcN0), of X, Y and Z, and Time difference (tm, offset) of X, Y and Z. Therefore, we may have measurements of $T_1$, $T_2 \ldots T_N$, so that we could compare the time difference for specific cell X, Y and Z. Maybe the measured Cell will change, but if the user doe not move his/her location, the (tm, offset) will not have change except the auto clock time of base station updated, but this will not happen frequency. It is notable that, sometimes the measurements of $T_1, T_2, \ldots, T_N$ are not always respectively corresponding to the measured Cell X, Y and Z, but are corresponding to the corresponding measured Cell mixed with others Cell. However, we may still use the relative pair of measurements for the judgment.

Figure 8:
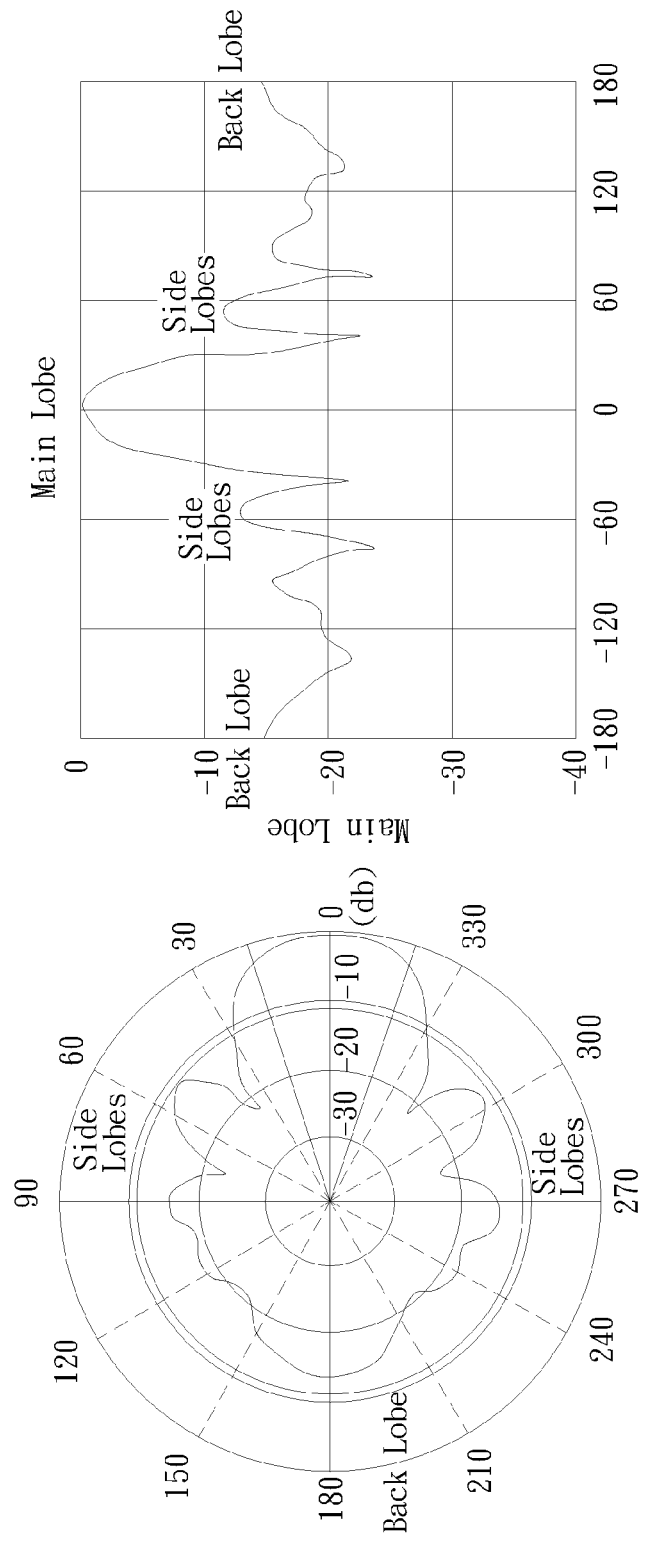
FIG. 8A shows an exemplary propagation model for the signal strength (Gain/Loss) of a Cell's antenna (pattern in polar coordinates) in accordance with the present invention.
FIG. 8B shows an exemplary propagation model for the signal strength (Gain/Loss) of a Cell's antenna (pattern in Cartesian coordinates) in accordance with the present invention.
Figure 9:
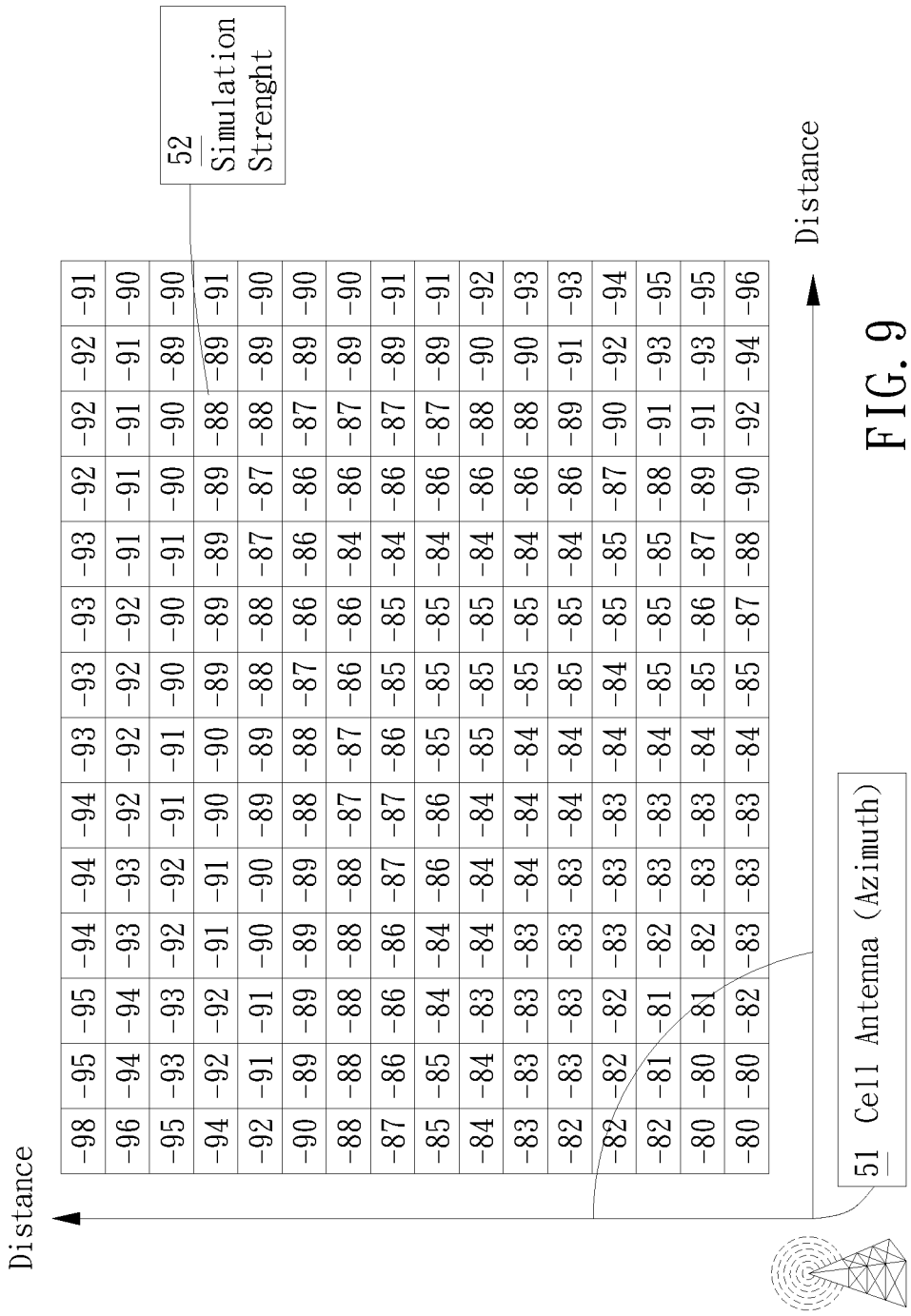
FIG. 9 shows an exemplary diagram of a simulation of signal strength of a Cell's antenna in accordance with the present invention.

Section (B): Signal Strength of Different Positioning of the Cell:

This section (B) is going to discuss the method and process to find the Cell's signal strength pattern for coverage location, which can be employed in the Step 422 and Step 423 of FIG. 5. FIG. 8A and FIG. 8B show an exemplary propagation model for the signal strength (gain/loss) of a Cell's antenna, wherein, FIG. 8A refers to the pattern in polar coordinates, while FIG. 8B refers to the pattern in Cartesian coordinates. FIG. 9 shows an exemplary diagram of a simulation of signal strength of a Cell's antenna.

In FIG. 9, each Cell with its domain coverage depended on its antenna pattern model. And for each of the coverage Tile (ex: 50 m*50 m), we may calculate the simulation of the signal strength. By the contents of FIGS. 8A, 8B and 9, we know the relationship between Cell antenna azimuth 51 and the simulation strength 52, in addition, we may consider the gain/loss, distance for each Tile (50 m*50 m) with the simulation reference signal strength. According to simulation data and statistic of the positioned event log, after the statistic processed, we find the indoor RSCP threshold, using the simulation signal strength to refine the threshold. The following is an example illustrating the method to find the indoor RSCP threshold and use the simulation signal strength to refine the threshold found.

Figure 10:
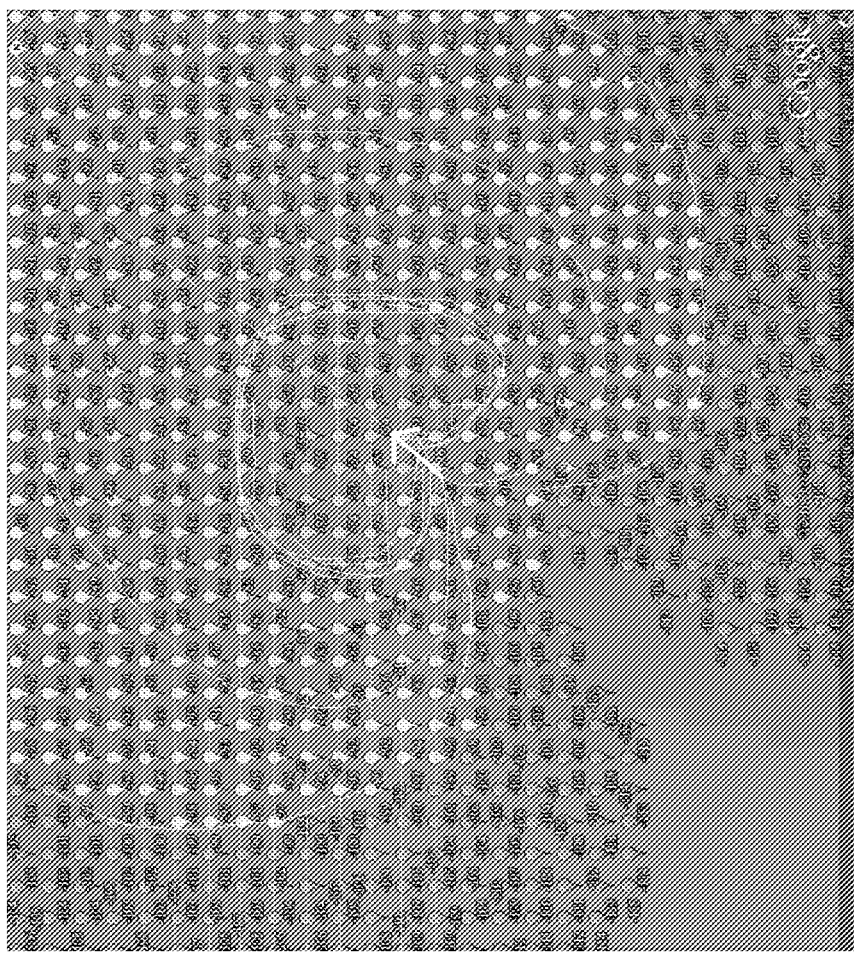
FIG. 10 is an exemplary diagram of a simulation result of signal strength for each location by its antenna gain loss pattern and the Azimuth, height of the base station, in accordance with the present invention.

First, for the positioned event logs of call, we denote the positioned area: $Tile_1, Tile_2, \ldots, Tile_k$ of the Cell like the graph and the propagation model simulation area of FIG. 9 and FIG. 10. Wherein, FIG. 10 is an exemplary diagram of a simulation result of signal strength for each location by its antenna gain loss pattern and the Azimuth, height of the base station.

Figure 11B:
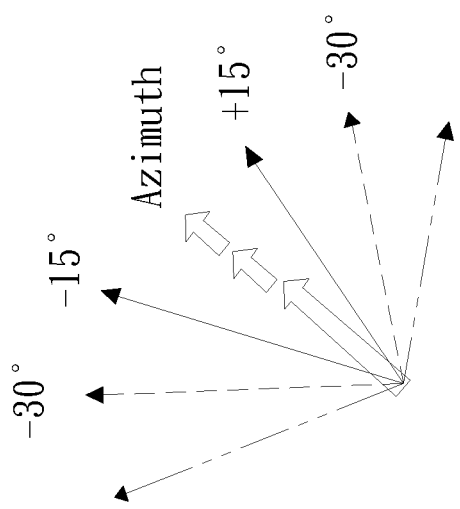
FIGS. 11A and 11B show exemplary diagrams of parameter Antenna Gain/Loss patterns in accordance with the present invention.
Figure 11A:
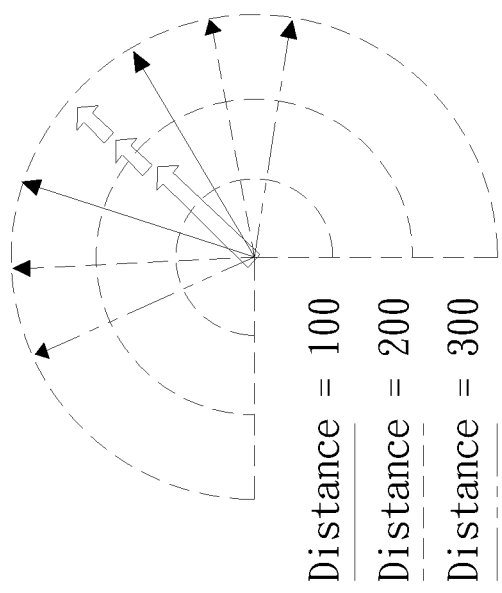
Figure 12A:
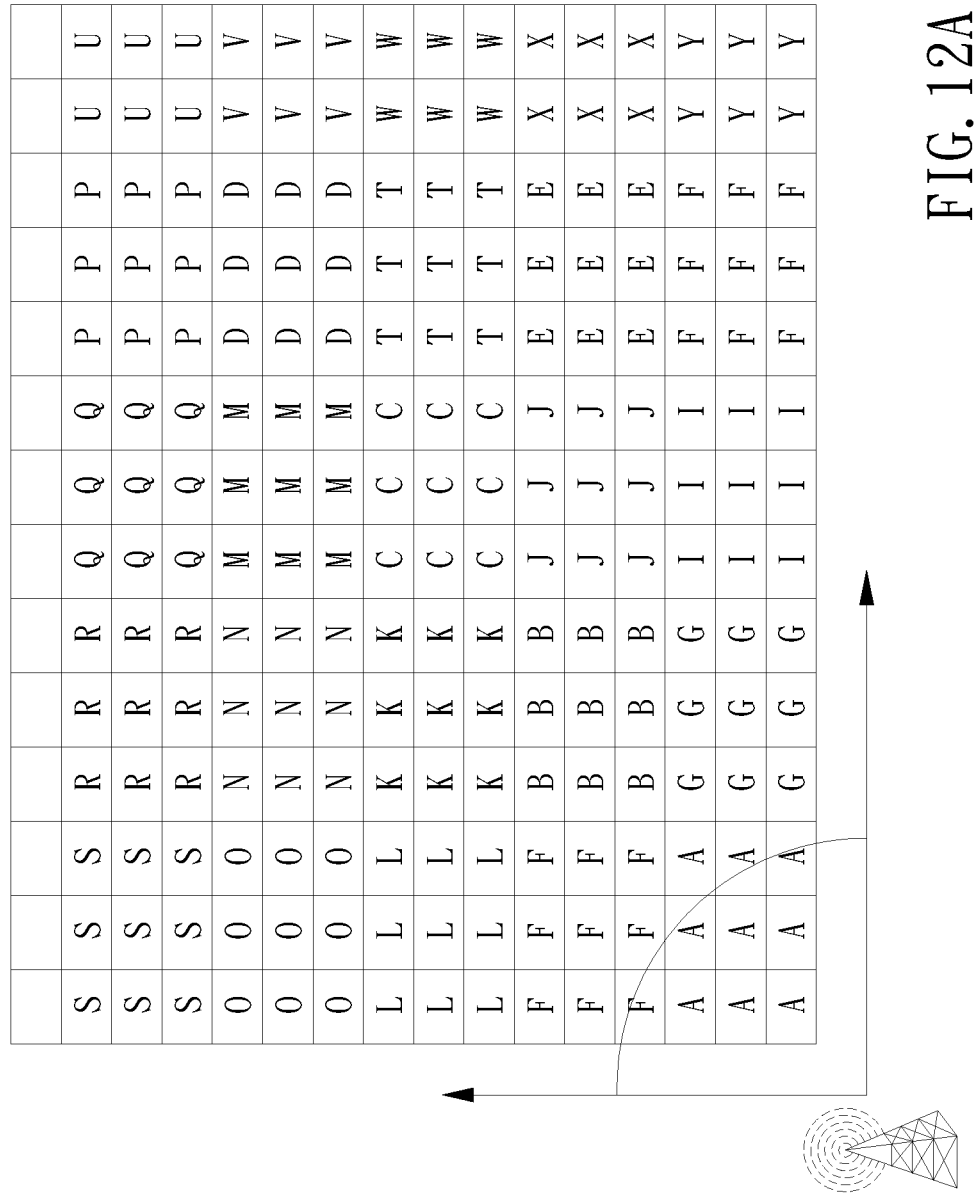
FIGS. 12A and 12B show exemplary diagrams of the partition areas by closed simulation signal strength in accordance with the present invention.
Figure 12B:
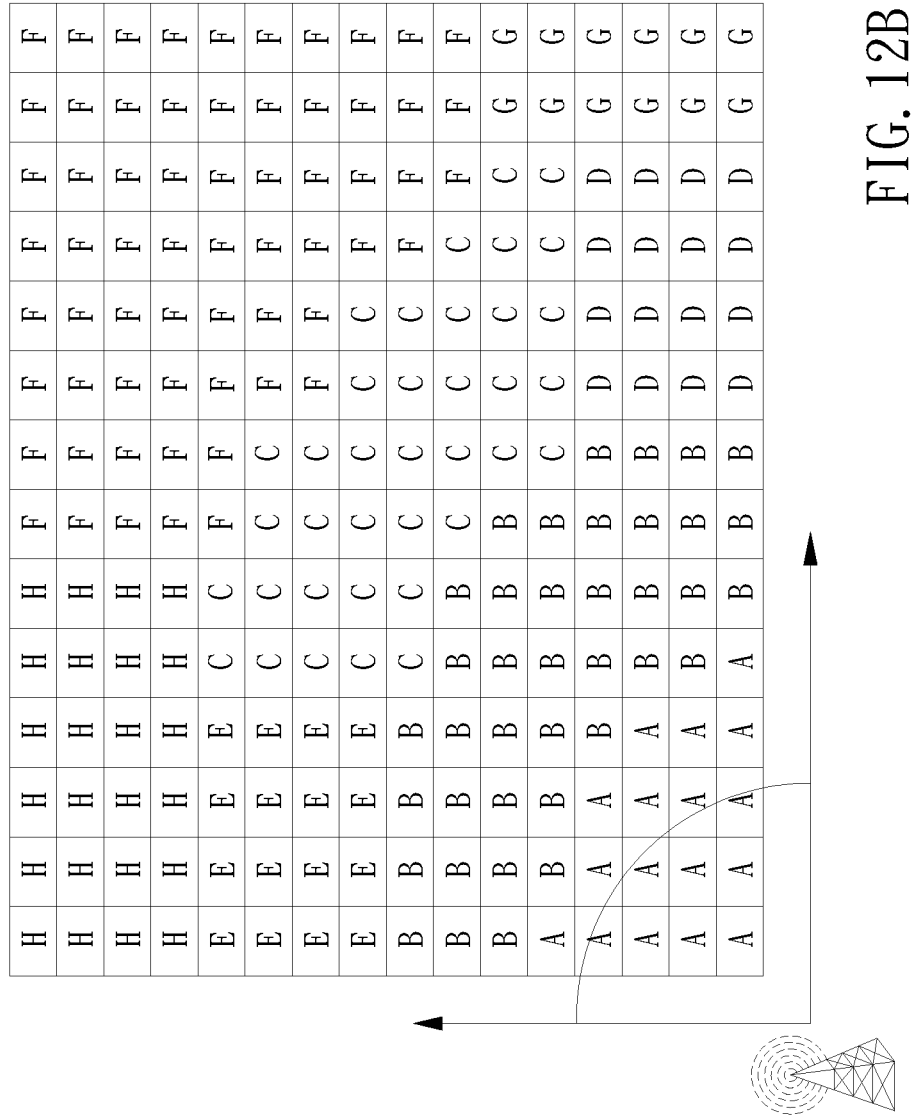

Therefore we may distribute those areas to be a large area group like the FIGS. 12A and 12B. Wherein, FIGS. 11A and 11B show exemplary diagrams of parameter antenna gain/loss patterns. FIGS. 12A and 12B show exemplary diagrams of the partition areas by closed simulation signal strength.

Group by (distance, simulation, Azimuth different from relative tile), for example:

For the Tile(area) is $Deg_1$ degree different from Azimuth, $Dist_1$ meter from Tile(area) to base station, $Sig_1$ Level of Simulation signal strength. Therefore the Group A will contains the area with $Dist_1$ from 0 to 150 m and $Deg_1$ in (Azimuth$_{basestation}$−30, Azimuth$_{basestation}$+30), and signal strength from (−60 dBm,-85 dBm), therefore, we may partition the coverage of base station to the following area block as which shown in FIGS. 12A and 12B.

Section (C): Find the Threshold of Signal Strength of the Indoor/Outdoor:

This section (C) is going to discuss the method and process to find the threshold of signal strength of the indoor/outdoor calls, which can be employed in the Step 37 of FIG. 2, Steps 415 and 419 of FIG. 4, Step 424 of FIG. 5, and Step 434 of FIG. 6.

Figure 13:
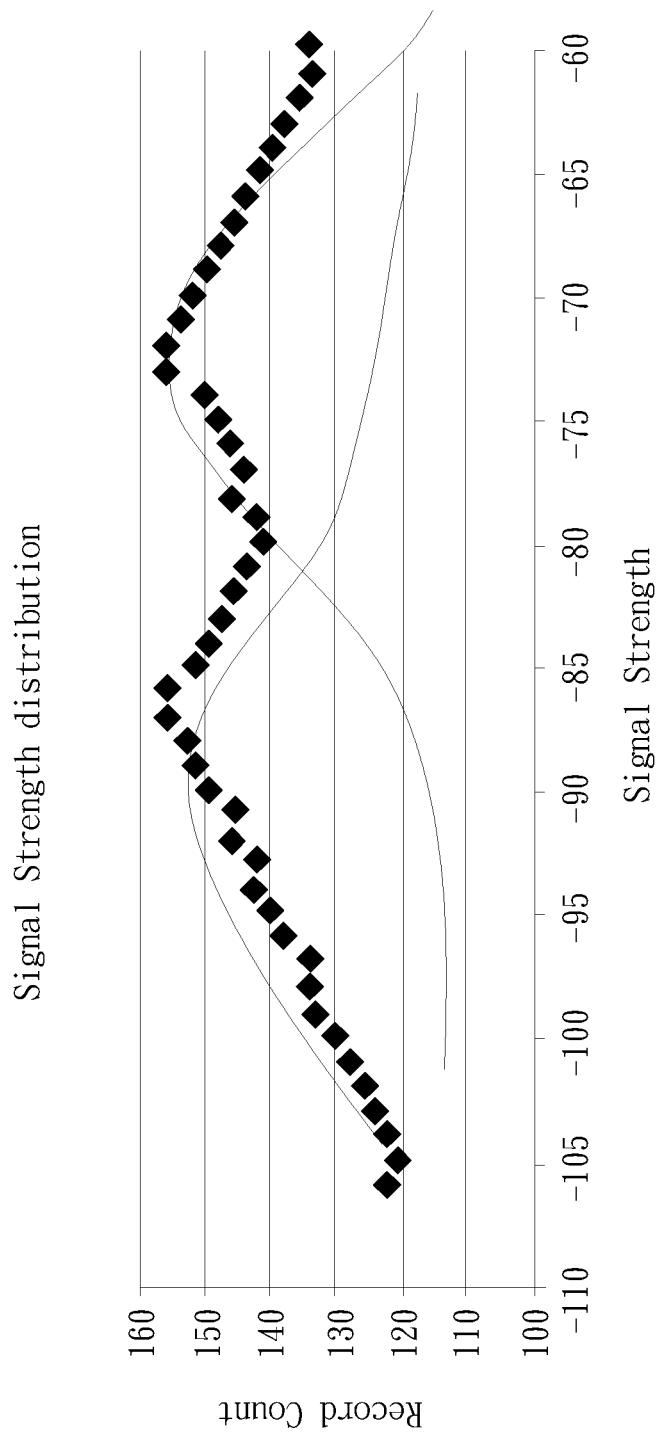
FIG. 13 shows an exemplary diagram of signal strength distribution in accordance with the present invention.

After grouping these $Tile_{xs}$ and $Tile_{ys}$ to be Block, as shown in FIGS. 12A and 12B, we collect those event log which are positioned on the Block. In these Block which maybe 100 m*100 m or larger, For the samples, we can use statistic to find the signal distribution. We may see the pattern of the signal strength distribution like FIG. 13. Wherein, FIG. 13 shows an exemplary diagram of signal strength distribution. So that we may find the maximum number of signal strength group (max number of records that measure the cell with the signal strength). Thereby, we can calculate a weighted average value "$RSCP_{outdoor}$" by using a plurality of signal strength values of previously known outdoor event logs to act as the threshold value of outdoor call, and also calculate another weighted average value "$RSCP_{indoor}$" by using a plurality of signal strength values of previously known indoor event logs to act as the threshold value of indoor call. And then we can use statistics methods to such like Normal Distribution method or POISSON Distribution method to calculate the probability values $P_{outdoor}$(RSCP) and $P_{indoor}$(RSCP) for the RSCP value contained in the new event log retrieved by the server. Such that, by using previously known event log data, we may find the threshold value $RSCP_{cellA}$ for this Cell, such that RSCP=Max($RSCP_1$, $RSCP_2$, $RSCP_3$, ..., $RSCP_n$) or $RSCP_{outdoor}$=$F_{avg}$($RSCP_1$, $RSCP_2$, $RSCP_3$, ..., $RSCP_n$)=($a_1$*$RSCP_1$+$a_2$*$RSCP_2$+$a_3$*$RSCP_3$+ ... +$a_n$*$RSCP_n$)/($a_1$+$a_2$+$a_3$+ ... +$a_n$); wherein, $RSCP_1$, $RSCP_2$, $RSCP_3$, ... and $RSCP_n$ are outdoor measurements of signal strength, and $a_1, a_2, a_3, \ldots, a_n$ are respectively the measurement count of $RSCP_1$, $RSCP_2$, $RSCP_3$, ... and $RSCP_n$. Similarly, we may also find that $RSCP_{indoor}$=$G_{avg}$($RSCP_1$, $RSCP_2$, $RSCP_3$, ..., $RSCP_t$)=($b_1$*$RSCP_1$+$b_2$*$RSCP_2$ $b_3$*$RSCP_3$+ ... +$b_t$*$RSCP_t$)/($b_1$+$b_2$+$b_3$+ ... +$b_t$) wherein, $RSCP_1$, $RSCP_2$, $RSCP_3$, ... and $RSCP_t$ are indoor measurements of signal strength, and $b_1, b_2, b_3, \ldots, b_n$ are respectively the measurement count of $RSCP_1$, $RSCP_2$, $RSCP_3$, ... and $RSCP_t$.

And we assume that the Best(max) $RSCP_i$ (where $_i$ is an integral) would be the main reference parameter threshold of outdoor signal strength. Also, we may define the second crowed RSCP could be the main reference parameter of indoor RSCP threshold. So that we can also obtain the values of $RSCP_{indoor}$ and $RSCP_{outdoor}$, as we denote the normal distribution of the user location for indoor or outdoor, we denote that outdoor user will has normal distribution for their location and signal strength, therefore use the variance of the RSCP of the data set, we may find a simulation model (like, Normal distribution, Poisson distribution), and to find the probability of each signal strength $P_{indoor}$(RSCP) and $P_{outdoor}$ (RSCP), so that we may find the probability of the signal strength of indoor and outdoor, and so we may define the following Equations:

$$T_1(RSCP) = \begin{cases} 0, \text{ if } P_{indoor}(RSCP) < P_{outdoor}(RSCP) : \text{Outdoor} \\ 1, \text{ if } P_{indoor}(RSCP) > P_{outdoor}(RSCP) : \text{Indoor} \end{cases}$$

Of course, we may find other combination to find the relation of the function T.

For the Area Block, we will have an average signal strength (or characteristic RSCP value, $RSCP_{char}$) to refine the $RSCP_{outdoor}$ and $RSCP_{indoor}$, like $RSCP_{outdoor\_refine} = U*RSCP_{outdoor} + (1-U)*RSCP_{char}$, where U could be the R-square of the RSCP distribution model, for R-square value is more attend to one means the reliability of pattern of the model.

Figure 14A:
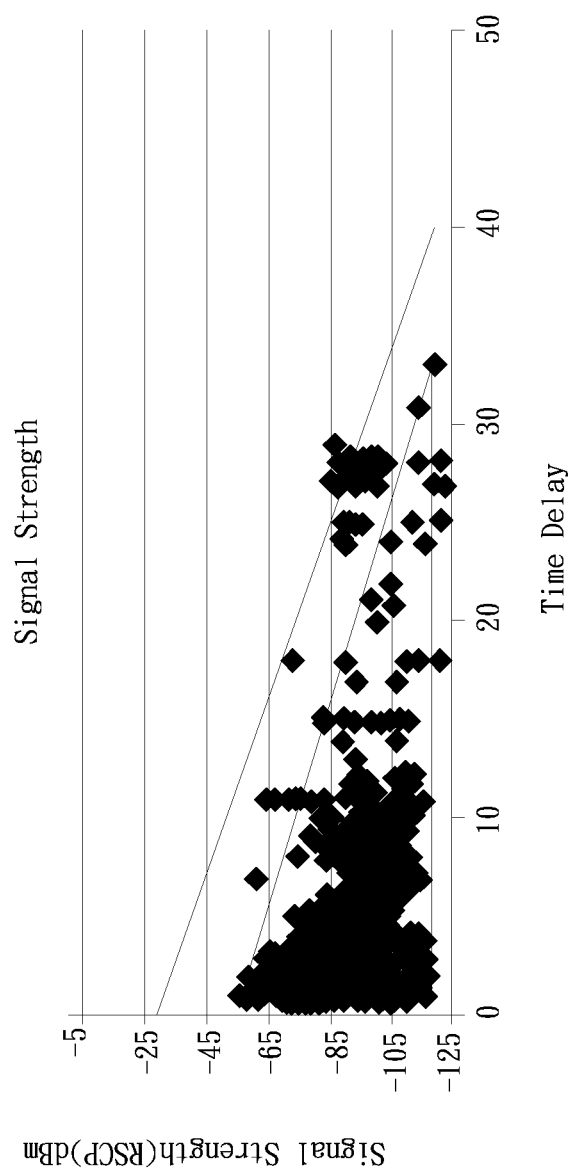
FIG. 14A is an exemplary diagram showing the positive relationship of the ((propagation model)) between the signal strength and time delay in accordance with the present invention.
Figure 14B:
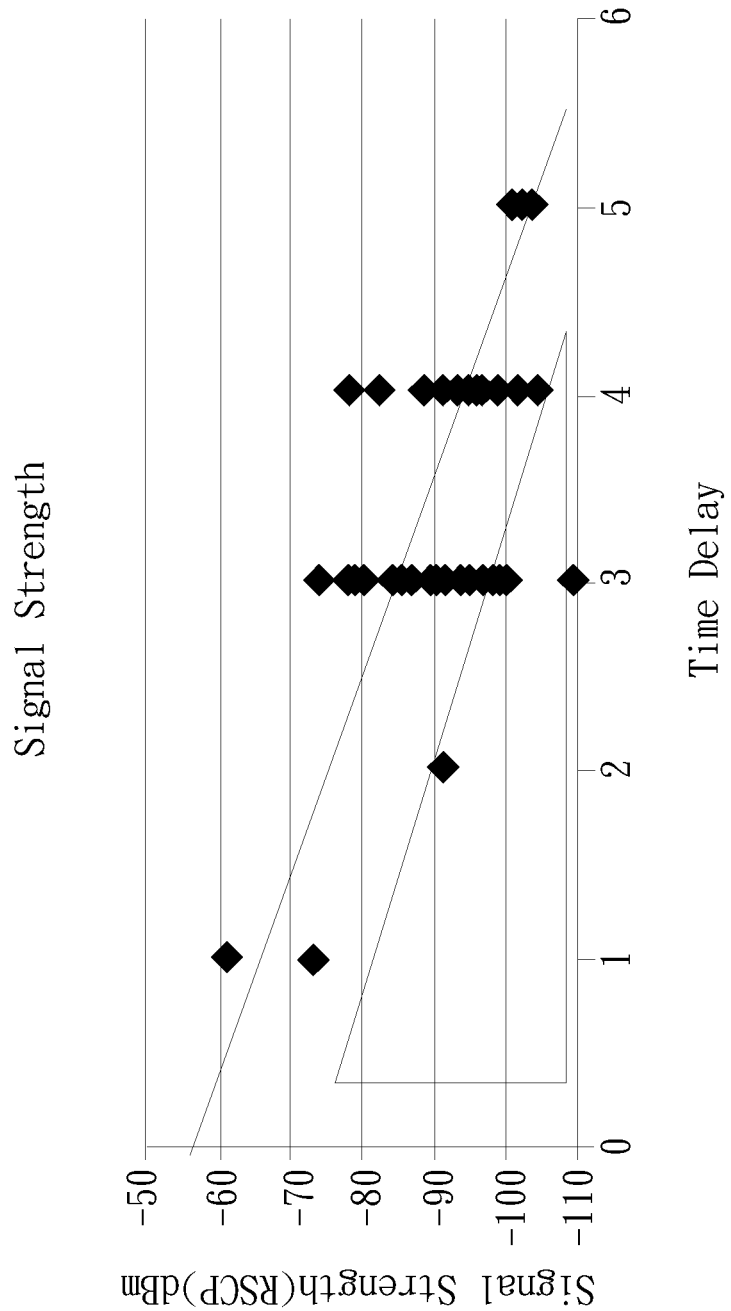
FIG. 14B is an exemplary diagram showing the positive relationship between the signal strength and time delay of a Cell in accordance with the present invention.

For our considerate of signal strength and time delay, as we known, signal strength and time delay was in positive relation of the ((propagation model)), as shown in FIG. 14A which is an exemplary diagram showing the positive relationship of the ((propagation model)) between the signal strength and time delay. And, for every Cell, we may find the same pattern of the signal strength and time delay, as shown in FIG. 14B which is an exemplary diagram showing the positive relationship between the signal strength and time delay of a Cell. In this embodiment, we use propagation delay to be the so called "time delay". However, it should be noted that, different delay unit might be used for determining the term "time delay" in different kind of telecommunication system; for example, in an LTE system, it would be TA (round trip delay).

Except the effect time delay of signal strength, also antenna pattern (propagation model) shows different angle form user's location to the Azimuth of the Cell also be the parameter of attenuation for the signal strength. So that we may limit the location area for the calls and measurement event logs. Limits the event log sample record in an area that with Azimuth different and time delay (distance).

Figure 15:
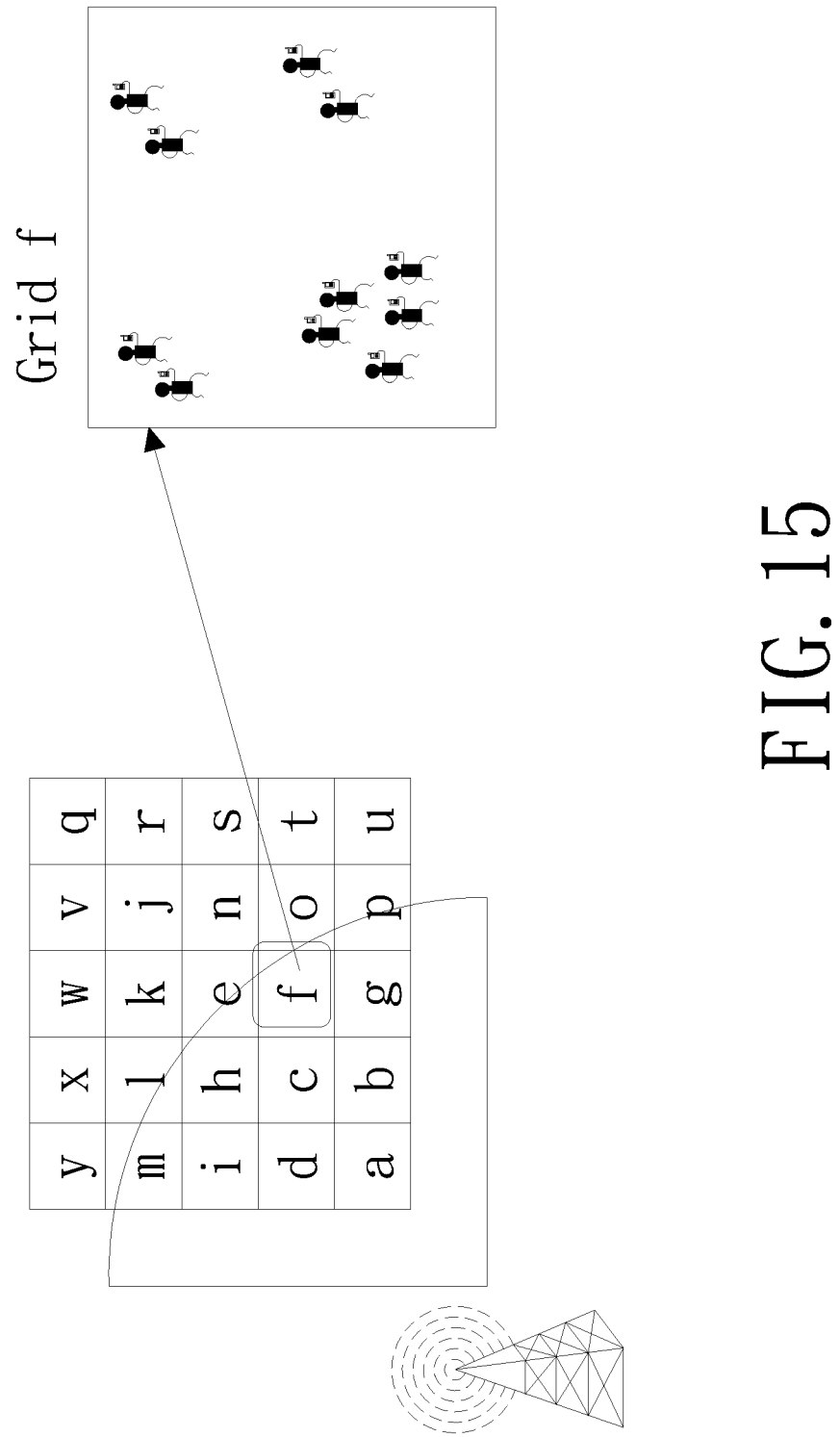
FIG. 15 shows a schematic exemplary diagram of a small Grid f in partition areas by closed simulation signal strength in accordance with the present invention.

Section (D): Indoor Call Signal Strength and Delta δ:

This section (D) is going to discuss the method and process to determine the relations between indoor call signal strength and delta δ, which can be employed to collocate with the method and process to find the threshold of signal strength of the indoor/outdoor calls discussed in the Section (C). Please refer to FIG. 15 which shows a schematic exemplary diagram of a small Grid f in partition areas by closed simulation signal strength.

1) We have just limited the Coverage of Cell to be union of many blocks, wherein each block could be a simulation of the relative RSCP (average and maximum) for the base station by antenna propagation model, so that Block will become $(RSCP_j)$.

Being limited in a block area, those positioned event log records with the same time-delay information are referring to the target Cell. In the closed region, the signal strength should be stable except the building loss, so that if Signal strength sudden drops to a smaller value for the crowd RSCP group, then we may consider that the call event with the weaker signal strength will be an indoor call (indoor event). For example:

1.1) Define $RSCP_{index}$ the value of $RSCP_{index}$ is an index RSCP value which can be defined by one of the following methods 1.1.1) to 1.1.4):

1.1.1) Perform the Propagation Model Simulation and calculate the $RSCP_{index}$;

1.1.2) From event log positioned in the Block(Region), use statistic method to find the value. Ext.: average and maximum, variance of the data set;

1.1.3) Relative to $RSCP_{index}$ of neighbor blocks, ext., Average of Neighbor's $RSCP_{index}$;

1.1.4) From data of Drive test, really measure the difference value in order to find the value. Ext.: average and maximum, variance of the data set.

1.2) define δ value, the value of δ can be defined by the following methods 1.2.1) to 1.2.3):

1.2.1) User define/User experience (Ex: 10-20 dBm)

Figure 16:
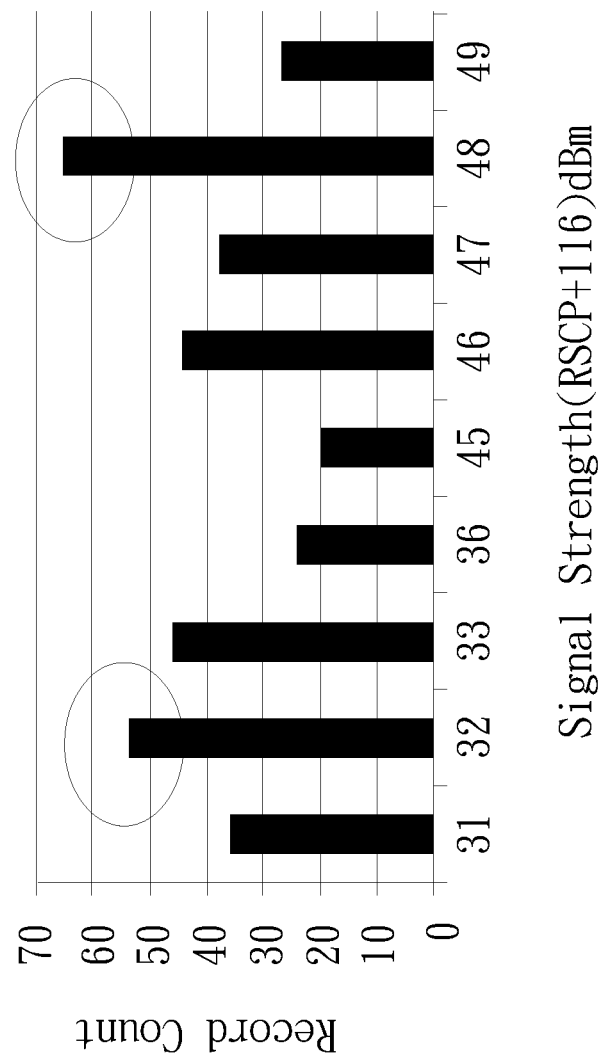
FIG. 16 shows a schematic exemplary diagram of a summary chart between Record Count versus Signal Strength in a limited grid area, in accordance with the present invention.

1.2.2) From event log positioned in the Block (Region), using statistic method find the value, ext. average and maximum, variance of the data set. For example, FIG. 16 shows a schematic exemplary diagram of a summary chart between Record Count versus Signal Strength in a limited grid area. It can be seen from FIG. 16 that, the signal strength values 32 and 48 have the greatest record counts values 53 and 63, respectively, and thus the value of δ can be calculated according to the example shown in FIG. 16 by the following steps:

Step 1. Find the 1st Mode RSCP in all samples of RSCP, e.g., the signal strength value 48;

Step 2. Find the Line which separates the data to two or more continue sample sets, like FIG. 16;

Step 3. Find the 2nd Mode RSCP for different continue sample set, e.g., the signal strength value 32

Thereby, the 1st Mode RSCP=48−116=−68 dBm, while the 2nd Mode RSCP=32−116=−84 dBm; and Step 4. Calculate the delta (δ)=(−68)−(−84)=16 dBm.

1.2.3) From data of Drive test, real measure difference value, find the value. Ext. average and maximum, variance of the data set. The calculating method can be similar to the one illustrated in section 1.2.2) and FIG. 16.

1.3) From the above discussed sections 1.1) and 1.2), we may find $RSCP_{index}$ and δ value: So that we can define a decision function for indoor/outdoor by the following Equation:

$$T_2(RSCP) = \begin{cases} 0 & \text{if } RSCP \geq RSCP_{index} & : \text{Outdoor} \\ 0.5 & \text{if } RSCP_{index} > RSCP \geq RSCP_{index} - \partial \\ 1 & \text{if } RSCP < RSCP_{index} - \partial & : \text{Indoor} \end{cases}$$

Although the above discussions in sections 1.1) to 1.3) illustrate an embodiment to calculate or define the index value $RSCP_{index}$. However, this $RSCP_{index}$ value can also be decided by the method discussed previously in Step 434, that is, to use the signal strength value of a previously known event log which has already been determined as an outdoor call by means of GPS data or Drive Test data to be the signal strength indicator "$RSCP_{index}$".

2) We also can use user's behavior for understanding some regular issues. Like we may use the event log, that was containing the specific user's information, so that we may use a long term's data for finding user behavior as well as moving path. For example: we select specific user's event about one week or more than one month's data, so if the same call-type or event-type occurs frequently, for example, if a specific user usually (50% possibility or higher) powers off his/her mobile device in the same place like bedroom, meeting room, library, theater, and etc., then we may have a conclusion to decide the call will be indoor call for this specific user if the positioned event happened in closed region (grid area).

3) For the limited grid area, cluster subscribers with the same behavior, we also may have confidence to use the judgment method of the present invention to determine the location is indoor or outdoor. So that if event log is positioned on the same grid area (e.g., the geographical position of the event log is located at or nearby the specific user's office or home) and also satisfies the signal strength condition that we defined above, the indoor/outdoor call type will be determined.

4) For the indoor or indoor candidate, we may use second and third measured cell to double-check the threshold again. We can judge the indoor call if the signal strength is below the threshold of the two cells.

CONCLUSION

The indoor/outdoor call judgment method of the present invention uses the above discussed data collection method to build up an Indoor indicator function, as well as refers to the users' behavior so as to generate a useful and yet precise judgment module. Using geo-location tools to position the calls (event logs) and using this method for automatic algorithm to classify the calls' location type to be indoor or outdoor on the map. We may use the classified call location type to show different signal strengths and qualities so that the call service vendor could used this information to analysis the network quality for different call type easily and save the detail drive test cost for labor and time costs.

While the present invention has been particularly shown and described with reference to a preferred embodiment, it will be understood by those skilled in the art that various changes in form and detail may be without departing from the spirit and scope of the present invention.

What is claimed is:

1. An indoor/outdoor call judgment method, comprising the following steps:
   Step (A): using a server for building at least one algorithm and indicator function for determining indoor/outdoor call, the algorithm and the indicator function are stored in a first database controlled by the server;
   Step (B): using the server to retrieve data of at least one event log from a second database, wherein said data of said event log are generated by call activities of at least one mobile device when said mobile device is telecommunicating with a base station; and then the server associating the retrieved event log data with a geographical position by means of a geo-location tool;
   Step (C): the server determining whether or not the event log is referring to a moving call; if the determining result is "YES", then the event log is determined to be referring to an outdoor call and proceed with Step (E); if the determining result is "NO", then proceed with Step (D);
   Step (D): the server determining whether or not the event log is referring to an indoor call by using the algorithm and indicator function stored in the first database; if the determining result is "YES", then the event log is determined to be referring to the indoor call; if the result is "NO"; then the event log is determined to be referring to the outdoor call; and
   Step (E): the server ending the indoor/outdoor call judgment method; and
   wherein a process to build the algorithm and indicator function of Step (A) comprises the following steps:
      Step (a1): the server acquiring another event log which is associated with its geographical position;
      Step (a2): the server finding at least one Cell whose signal strength pattern can cover said geographical position of said event log, and then building a measurement signal strength data base for the Cell according to said signal strength pattern;
      Step (a3): the server performing simulation of each said Cell's antenna pattern, and using a statistic method for finding the Cell's pattern for each grid region of the pattern, and then finding pattern of signal strength and time delay for each said Cell's coverage; and
      Step (a4): the server determining an indoor/outdoor signal strength indicator for each grid region by using the results of the simulation mentioned in Step (a3); and storing the indoor/outdoor signal strength indicators in the first database.

2. The indoor/outdoor call judgment method of claim 1, wherein a process for analyzing a specific user's behavior in order to generate at least one user behavior parameter is included in Step (A), the user behavior parameter is considered when building said algorithm and indicator function; and wherein another process is included in Step (D) to analyze the event log associated with the specific user to see if there is any data of the event log match any said user behavior parameter so as to determine whether or not the event log is referring to said indoor call.

3. The indoor/outdoor call judgment method of claim 2, wherein, during the process of analyze the event log associated with the specific user in Step (D), if the geographical position associated with the event log data is at or nearby the specific user's office or home, and the event log data contains the events of either vast data transmission or manually turn off the mobile device, then the event log is determined to be referring to the indoor call.

4. The indoor/outdoor call judgment method of claim 1, wherein the algorithm and the indicator function comprise at least one of the following: a signal strength indicator, a signal strength threshold and a signal strength level.

5. The indoor/outdoor call judgment method of claim 1, wherein the process for determining whether or not the event log is referring to an indoor call by using the algorithm and indicator function of Step (D) comprises the following step:
   the server comparing the data of the event log retrieved from the second database with the indoor/outdoor signal strength indicators stored in the first database to see whether the signal strength data contained in the event log retrieved from the second database are under a signal strength level according to the indoor/outdoor signal strength indicators or not, so as to decide the event log retrieved from the second database is an indoor call or an outdoor call.

6. The indoor/outdoor call judgment method of claim 5, wherein, after Step (a3) is performed, the indoor/outdoor signal strength indicators can be defined by the following equation:

$$T_1(RSCP) = \begin{cases} 0, \text{ if } P_{indoor}(RSCP) < P_{outdoor}(RSCP): \text{Outdoor} \\ 1, \text{ if } P_{indoor}(RSCP) > P_{outdoor}(RSCP): \text{Indoor} \end{cases}$$

wherein, $RSCP_{outdoor} = F_{avg}(RSCP_1, RSCP_2, RSCP_3, \ldots, RSCP_n) = (a_1 * RSCP_1 + a_2 * RSCP_2 + a_3 * RSCP_3 + \ldots + a_n * RSCP_n)/(a_1 + a_2 + a_3 + \ldots + a_n)$; wherein, $RSCP_1$, $RSCP_2$, $RSCP_3$, ... and $RSCP_n$ are outdoor measurements of signal strength, and $a_1, a_2, a_3, \ldots, a_n$ are respectively the measurement count of $RSCP_1$, $RSCP_2$, $RSCP_3$, ... and $RSCP_n$;

wherein, $RSCP_{indoor} = G_{avg}(RSCP_1, RSCP_2, RSCP_3, \ldots, RSCP_t) = (b_1 * RSCP_1 + b_2 * RSCP_2 + b_3 * RSCP_3 + \ldots + b_t * RSCP_t)/(b_1 + b_2 + b_3 + \ldots + b_t)$; wherein, $RSCP_1$, $RSCP_2$, $RSCP_3$, ... and $RSCP_t$ are indoor measurements of signal strength, and $b_1, b_2, b_3, \ldots, b_n$ are respectively the measurement count of $RSCP_1, RSCP_2, RSCP_3, \ldots$ and $RSCP_t$, wherein, RSCP is either an average or a maximum MEASURED_RSCP value contained in the event log; $RSCP_{outdoor}$ is the signal strength indicator for outdoor call, and $RSCP_{indoor}$ is the signal strength indicator for indoor call; $P_{indoor}(RSCP)$ and $P_{outdoor}(RSCP)$ are the probability of the signal strength.

7. The indoor/outdoor call judgment method of claim 6, wherein, the value of $RSCP_{outdoor}$ can be refined by the following equation:

$$RSCP_{outdoor\_refine} = U*RSCP_{outdoor} + (1-U)*RSCP_{char};$$

where U could be an R-square of RSCP distribution model, and $RSCP_{char}$ is a characteristic RSCP value.

8. The indoor/outdoor call judgment method of claim 5, wherein, after Step (a3) is performed, the indoor/outdoor signal strength indicators can be defined by the following equation:

$$T_2(RSCP) = \begin{cases} 0 & \text{if } RSCP \geq RSCP_{index} & : \text{Outdoor} \\ 0.5 & \text{if } RSCP_{index} > RSCP \geq RSCP_{index} - \partial \\ 1 & \text{if } RSCP < RSCP_{index} - \partial & : \text{Indoor} \end{cases}$$

wherein, RSCP is either an average or a maximum MEASURED_RSCP value contained in the event log;

wherein, $RSCP_{index}$ is an index RSCP value which can be defined by one of the following methods: (i) performing the Propagation Model Simulation and calculate the $RSCP_{index}$.; (ii) using statistic method to find the $RSCP_{index}$. value according to the event log; (iii) calculating an average value of Neighbor's $RSCP_{index}$ to obtain the $RSCP_{index}$. value; (iv) really measuring the difference value obtained from data of Drive test in order to find the $RSCP_{index}$ value;

wherein, the $\partial$ value can be defined by one of the following methods: (i) defining the $\partial$ value by user experience; (ii) using statistic method find the $\partial$ value according to the event log; (iii) really measuring the difference value obtained from data of Drive Test in order to find the $\partial$ value.

9. The indoor/outdoor call judgment method of claim 8, wherein, the value of $\partial$ is between 10-20 dBm.

10. An indoor/outdoor call judgment method, comprising the following steps:

Step (A): using a server for building at least one algorithm and indicator function for determining indoor/outdoor call, the algorithm and the indicator function are stored in a first database controlled by a the server;

Step (B): using the server to retrieve data of at least one event log from a second database, wherein said data of said event log are generated by call activities of at least one mobile device when said mobile device is telecommunicating with a base station; and then the server associating the retrieved event log data with a geographical position by means of a geo-location tool;

Step (C): the server determining whether or not the event log is referring to a moving call; if the determining result is "YES", then the event log is determined to be referring to an outdoor call and proceed with Step (E); if the determining result is "NO", then proceed with Step (D):

Step (D): the server determining whether or not the event log is referring to an indoor call by using the algorithm and indicator function stored in the first database; if the determining result is "YES", then the event log is determined to be referring to the indoor call; if the result is "NO": then the event log is determined to be referring to the outdoor call; and Step (E): the server ending the indoor/outdoor call judgment method; wherein the moving call of Step (C) is determined by using time difference data (tm, offset) contained in the event log in such a manner that, if the values of (tm, offset) do not change too much in the event log, then the event log is not the moving call; the base station is an outdoor antenna base station base station.

11. An indoor/outdoor call judgment method, comprising the following steps:

Step (A): using a server for analyzing a specific user's behavior in order to generate at least one user behavior parameter, and building at least one algorithm and indicator function for determining indoor/outdoor call; wherein the user behavior parameter, the algorithm and the indicator function are stored in a first database controlled by the server;

Step (B): using the server to retrieve data of at least one event log associated with the specific user from a second database, wherein said data of said event log are generated by call activities of a mobile device when said mobile device is telecommunicating with a base station; and then the server associating the retrieved event log data with a geographical position by means of a geo-location tool;

Step (D): the server analyzing the event log associated with the specific user to see if there is any data of the event log match any said user behavior parameter so as to determine whether or not the event log is referring to said indoor call, and then determining whether or not the event log is referring to an indoor call by using the algorithm and indicator function stored in the first database; if the determining result is "YES", then the event log is determined to be referring to the indoor call; if the result is "NO"; then the event log is determined to be referring to the outdoor call; and Step (E): the server ending the indoor/outdoor call judgment method.

12. The indoor/outdoor call judgment method of claim 11, wherein a Step (C) is performed between Step (B) and Step (D): the server determining whether or not the event log is referring to a moving call; if the determining result is "YES", then the event log is determined to be referring to an outdoor call and proceed with Step (E); if the determining result is "NO", then proceed with Step (D).

13. The indoor/outdoor call judgment method of claim 11, wherein, during the process of analyze the event log associated with the specific user in Step (D), if the geographical position associated with the event log data is at or nearby the specific user's office or home, and the event log data contains the events of either vast data transmission or manually turn off the mobile device, then the event log is determined to be referring to the indoor call.

14. The indoor/outdoor call judgment method of claim 11, wherein a process to build the algorithm and indicator function of Step (A) comprises the following steps:

Step (a1): the server acquiring another event log which is associated with its geographical position;

Step (a2): the server finding at least one Cell whose signal strength pattern can cover said geographical position of said event log of Step (a1), and then building a measurement signal strength data base for the Cell according to said signal strength pattern;

Step (a3): the server performing simulation of each said Cell's antenna pattern, and using a statistic method for finding the Cell's pattern for each grid region of the pattern, and then finding pattern of signal strength and time delay for each said Cell's coverage; and Step (a4): the server determining an indoor/outdoor signal strength indicator for each said grid region by using the results of the simulation mentioned in Step (a3); and storing the indoor/outdoor signal strength indicators in the first database.

15. The indoor/outdoor call judgment method of claim 14, wherein the process for determining whether or not the event log is referring to an indoor call by using the algorithm and indicator function of Step (D) comprises the following step:

the server comparing the data of the event log retrieved from the second database with the indoor/outdoor signal strength indicators stored in the first database to see whether the signal strength data contained in the event log retrieved from the second database are under a signal strength level according to the indoor/outdoor signal strength indicators or not, so as to decide the event log retrieved from the second database is an indoor call or an outdoor call.

16. The indoor/outdoor call judgment method of claim 15, wherein, after Step (a3) is performed, the indoor/outdoor signal strength indicators can be defined by the following equation:

$$T_1(RSCP) = \begin{cases} 0, \text{ if } P_{indoor}(RSCP) < P_{outdoor}(RSCP) : \text{Outdoor} \\ 1, \text{ if } P_{indoor}(RSCP) > P_{outdoor}(RSCP) : \text{Indoor} \end{cases}$$

wherein, $RSCP_{outdoor} = F_{avg}(RSCP_1, RSCP_2, RSCP_3, \ldots, RSCP_n) = (a_1*RSCP_1 + a_2*RSCP_2 + a_3*RSCP_3 + \ldots + a_n*RSCP_n)/(a_1 + a_2 + a_3 + \ldots + a_n)$; wherein, $RSCP_1, RSCP_2, RSCP_3, \ldots$ and $RSCP_n$ are outdoor measurements of signal strength, and $a_1, a_2, a_3, \ldots, a_n$ are respectively the measurement count of $RSCP_1, RSCP_2, RSCP_3, \ldots$ and $RSCP_n$;

wherein, $RSCP_{indoor} = G_{avg}(RSCP_1, RSCP_2, RSCP_3, \ldots, RSCP_t) = (b_1*RSCP_1 + b_2*RSCP_2 + b_3*RSCP_3 + \ldots + b_t*RSCP_t)/(b_1 + b_2 + b_3 + \ldots + b_t)$; wherein, $RSCP_1, RSCP_2, RSCP_3, \ldots$ and $RSCP_t$ are indoor measurements of signal strength, and $b_1, b_2, b_3, \ldots, b_n$ are respectively the measurement count of $RSCP_1, RSCP_2, RSCP_3, \ldots$ and $RSCP_t$, wherein, RSCP is either an average or a maximum MEASURED_RSCP value contained in the event log;

$RSCP_{outdoor}$ is the signal strength indicator for outdoor call, and $RSCP_{indoor}$ is the signal strength indicator for indoor call; $P_{indoor}(RSCP)$ and $P_{outdoor}(RSCP)$ are the probability of the signal strength.

17. The indoor/outdoor call judgment method of claim 16, wherein, the value of $RSCP_{outdoor}$ can be refined by the following equation:

$$RSCP_{outdoor\_refine} = U*RSCP_{outdoor} + (1-U)*RSCP_{char};$$

where U is an R-square of RSCP distribution model, and $RSCP_{char}$ is a characteristic RSCP value.

18. The indoor/outdoor call judgment method of claim 15, wherein, after Step (a3) is performed, the indoor/outdoor signal strength indicators can be defined by the following equation:

$$T_2(RSCP) = \begin{cases} 0 & \text{if } RSCP \geq RSCP_{index} & : \text{Outdoor} \\ 0.5 & \text{if } RSCP_{index} > RSCP \geq RSCP_{index} - \partial \\ 1 & \text{if } RSCP < RSCP_{index} - \partial & : \text{Indoor} \end{cases}$$

wherein, RSCP is either an average or a maximum MEASURED_RSCP value contained in the event log;

wherein, $RSCP_{index}$ is an index RSCP value which can be defined by one of the following methods: (i) performing a Propagation Model Simulation and calculate the $RSCP_{index}$; (ii) using statistic method to find the $RSCP_{index}$ value according to the event log; (iii) calculating an average value of Neighbor's $RSCP_{index}$ to obtain the $RSCP_{index}$ value; (iv) really measuring the difference value obtained from data of Drive test in order to find the $RSCP_{index}$ value;

wherein, the $\partial$ value can be defined by one of the following methods: (i) defining the $\partial$ value by user experience; (ii) using statistic method find the $\partial$ value according to the event log; (iii) really measuring the difference value obtained from data of Drive Test in order to find the $\partial$ value; wherein the value of $\partial$ is between 10-20 dBm.

19. The indoor/outdoor call judgment method of claim 12, wherein the moving call of Step (C) is determined by using time difference data (tm, offset) contained in the event log in such a manner that, if the values of (tm, offset) do not change too much in the event log, then the event log is not the moving call; the base station is an outdoor antenna base station base station.

* * * * *